US007615699B1

(12) United States Patent
McNulty

(10) Patent No.: US 7,615,699 B1
(45) Date of Patent: Nov. 10, 2009

(54) BODY MOLDING PIPE BAG COVER

(76) Inventor: Brian P. McNulty, 116 Red Oak La., Bangor, PA (US) 18013

(*) Notice: Subject to any disclaimer, the term of this patent is extended or adjusted under 35 U.S.C. 154(b) by 0 days.

(21) Appl. No.: 12/288,942

(22) Filed: Oct. 24, 2008

(51) Int. Cl.
*G01D 7/00* (2006.01)

(52) U.S. Cl. .................................................... 84/380 B

(58) Field of Classification Search ............... 84/280 B, 84/287 A, 380 R
See application file for complete search history.

(56) References Cited

U.S. PATENT DOCUMENTS 3,756,112 A * 9/1973 Adams ..................... 84/380 B

* cited by examiner

*Primary Examiner*—Kimberly R Lockett
(74) *Attorney, Agent, or Firm*—Sanford J. Piltch, Esq.

(57) ABSTRACT

A breathable, body molding pipe bag cover made from Nylon elastane, with cotton side panels and chainette fringe for decoration purposes. The bag cover is composed of three panels; the main panel being a butterfly shaped nylon spandex composite with two flanking wing shaped panels made from cotton. A plurality of openings or apertures, encircled by nylon drone rings, which allow for the insertion and tight fitting of the chanter stock, blow stick, and bass, middle tenor and outside tenor pipes. The left and right side panels have Velcro® fasteners along their rear edges and a zipper closure along the bottom portion of each side panel, to permit the bottom ends of the side panels to be secured together. The Velcro® fastener and zipper allow the piper to have easy access for inserting the pipe bag, maintain a tight closure once they are engaged, and retain the bag, within the bag cover, and the bag cover in proper playing position while playing the instrument.

6 Claims, 2 Drawing Sheets

BODY MOLDING PIPE BAG COVER

BACKGROUND OF THE INVENTION

The present invention relates to pipe bag covers. The invention is designed to replace the sagging and loose fitting pipe bag covers when the bag is compressed with a one of a kind, breathable, body molding cover. The cover of the present design is capable of fitting any and all levels of pipes.

Earlier pipe bag covers were made from cowhide, sheepskin, and occasionally Gortex® or were hybrid bags having an animal hide outside and a synthetic inside. Moreover, these pipe bag covers were composed of two half-moon shaped panels, which were sewn together. These bag covers tend to resist flexing and not easily expand to accommodate differently sized pipe bags, and it is common for bagpipers to have problems finding an appropriately sized pipe bag cover without simply trying out covers of all different sizes until they find one that will fit their pipe bag. The sizes of these pipe bag covers range from approximately 23 inches (or less) for an extra small pipe bag, to 23-26 inches for a small pipe bag, to 26-28 inches for a medium pipe bag, and 28-30 inches for a large pipe bag.

Sometimes a smaller bag cover may affect the sound of the bagpipe, which causes a problem for the user. This non-fit of the pipe bag cover results in bagpipers having to create custom made bag covers to fit the precise proportions of their pipe bags. This can result in a bagpiper having to wait months for their bag cover to be delivered from the custom cover manufacturer, and also with an increased cost.

Once a bagpiper receives a new pipe bag cover that is made from animal hide, they must learn how to "tie-in" the bag cover and also how to "season" the bag cover. Seasoning is the process of keeping a hide bag airtight by having to consistently apply a gooey concoction, which tends to make the bag airtight trapping moisture inside the bag where it can cause both short and long-term problems. Presently existing bag covers have less "give," i.e. flexibility, because they are made from a non-stretchable fabric, such as animal hide.

Synthetic replacements for leather have been tried over the years, one obvious example being rubber. Some Italian and Spanish pipes are commonly found with rubber bag covers, but the problem, again, is moisture. The inside of the rubber pipe bag cover quickly turns into a sauna, with detrimental effects on the reeds and eventually on the wood of the pipes.

A continuing problem with pipe bag covers is the drooping and falling from the proper carrying placement for the instrument. The pipe bag and cover should be carried and rest between the mid side torso and the upper arm of the user. However, once air is released from the pipe bag for the blowing of the pipes and the internal pressure changes, the pipe bag contracts and the bag cover, which had been tightly fitting about the pipe bag, becomes loose and usually drops down toward the waist and elbow of the bagpiper. The bagpiper must constantly readjust the pipe bag position while playing the instrument, which can make the bagpipe cumbersome for the piper due to the constant shifting while playing the pipes.

A few years ago bags using high-tech synthetic materials that are airtight but breathable so moisture can escape were developed, and have become popular especially for the Great Highland Bagpipe. The most common of these materials is Gortex.® Drawbacks to Gortex® include price, reliability, and feel. Gortex® is easier to accidentally tear or puncture. Also, many long-time pipers do not like the sudden looser, more flexible feeling of a Gortex® bag under the bag cover. A further complaint is that the Gortex® bag does not stay put under the arm as easily as leather and that it tends to slither around inside the bag cover.

Therefore, a need exists for a bag cover that is not stiff and unyielding, and is capable of expansion and then contraction back to its original size and shape without dropping away from the bagpiper's hold, moving out of instrument playing position while in use.

A need also exists for a bag cover that can be used by a variety of pipers, without the requirement for custom manufacture, and that can be made available quickly at a lesser cost to the piper. A need also exists for a bag cover to be made from a breathable material so that moisture is not trapped inside the pipe bag cover.

Still further, a need exists for a bag cover that does not need to be "tied-in" to the pipe bag or to be "seasoned", once the bagpiper receives the bag cover, so that the bag cover is relatively maintenance free.

SUMMARY OF THE INVENTION

The present invention is a breathable, body molding pipe bag cover made from Nylon elastane, with cotton side panels and chainette fringe for decoration purposes. The cover is composed of three panels; the main panel being a butterfly shaped nylon spandex composite with two flanking wing shaped panels made from cotton. Within the main butterfly shaped panel there are a plurality of openings or apertures, encircled by nylon drone rings, which allow for the insertion and tight fitting of the chanter stock, blow stick, and bass, middle tenor and outside tenor pipes. The main panel is preferred to be made from a breathable elastane, nylon or any combination of these fibers with other fabrics.

The butterfly shaped panel has a long narrow portion at its rear end and a short wider portion at its front end. The middle portion of the butterfly shaped panel is wide and has the shape of wings. This winged mid-portion contains the apertures encircled by the nylon drone rings, which are the apertures in the bag cover to connect the bass, middle tenor and outside tenor pipes and the blow stick to the pipe bag. The chanter stock aperture is formed and located at the front end of the butterfly panel. Each of the apertures is encircled by nylon rings that are approximately 1½ inches in thickness to ensure an airtight seal between the pipe bag and the bagpipe elements.

The three panels of the pipe bag cover are sewn together. The left and right side panels have Velcro® fasteners along their rear edges and a zipper closure along the bottom portion of each side panel, to permit the bottom ends of the side panels to be secured together. The Velcro® fastener and zipper allow the piper to have easy access to the inside of the bag cover for inserting the pipe bag, maintain a tight closure once they are engaged, and retain the bag, within the bag cover, and the bag cover in proper playing position while playing the instrument.

The various sizes of the bag cover of the present invention range from approximately 25⅞ inches for extra small pipe bags to 32⅞ inches for large pipe bags. The bag cover also may display 1 inch chainette fringes around the apertures for the reeds and back end of the cover for decoration purposes.

It is an object of the present invention, to provide a breathable, body-molding pipe bag cover that will not cause the collection moisture within the bag resulting in damage to the reeds and will not slip out of place while in use.

It is another object of the present invention to provide a pipe bag cover that will maintain an airtight closure but will still allow for easy access to the internal elements of the pipe bag.

It is yet another object of the present invention to provide a pipe bag cover that is sized to easily fit a variety of differently dimensioned pipe bags and is readily available without the need for custom manufacturing.

Other objects will appear hereinafter.

DETAILED DESCRIPTION OF THE INVENTION

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
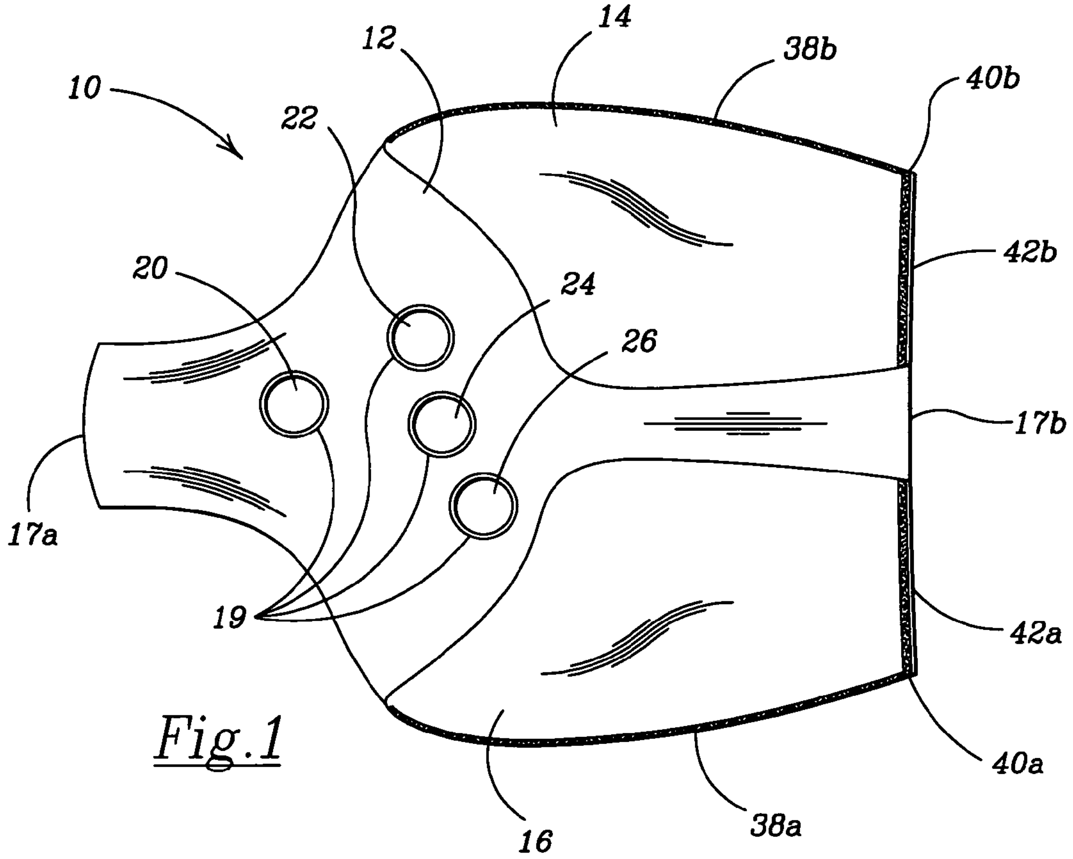
FIG. 1 is a top plan view of the pipe bag cover of the present invention spread flat.

Referring now to the drawings in detail, wherein like numerals refer to like parts or elements, there is shown in FIG. 1, an improved pipe bag cover 10. The pipe bag cover 10 is a breathable, body molding combination of natural and synthetic fabrics. The bag pipe cover 10 is composed of three separate panels; a main panel 12, a right side panel 14 and left side panel 16. The main panel 12 is configured into the approximate shape of a butterfly, containing a number of apertures for the pipes, blow stick and chanter, which forms the front and top portions of the pipe bag cover as described in greater detail below.

The pipe bag cover 10 is made from a combination of natural and synthetic fibers. The butterly portion, or main panel 12, is made from one or more flexible, expandable synthetic fibers: elastane and nylon. Elastane is a synthetic polymer known for its exceptional elasticity. It is stronger and more durable than rubber, consisting of a long chain polymer called polyurethane, which is produced by reacting a polyester with a diisocyanate. Elastane contains at least 85% polyurethane. The polymer is converted into a fiber using a dry spinning technique. At room temperature elastane can be stretched and expanded to twice its original dimensional size and, after removal of the tensile load, it will immediately return to its original size. Elastane is compatible with other materials, and can be spun with other types of fibers to produce unique fabrics, which have the characteristics of both fibers. Nylon is a synthetic thermoplastic fiber (Nylon melts/glazes easily at relatively low temperatures) with round, smooth and shiny filament fibers. Nylon is related chemically to the protein fibers silk and wool. These synthetic fibers are combine to form the stretchable portion of the pipe bag cover, and to form the apertures for the attachment of the bag pipe elements.

Attached to the main panel 12 are two flanking wing-shaped panels, the right side panel 14 and the left side panel 16. The right and left side panels 14, 16 are made from a natural fiber: cotton. The cotton in these panels provides for an increased frictional contact between the pipe bag and the cover, and between the pipe bag cover and the clothing of the bagpiper. The increased frictional contact will reduce the pipe bag slippage within the cover during compression and the simultaneous failure to remain in proper playing position.

The three panels 12, 14, and 16 are sewn together to create an airtight, yet breathable environment for the bagpipe interior, while at the same time being moldable to the pipe bag and to the bagpiper's body so that the pipe bag will not drop downward from the bagpiper's grip while playing the instrument.

Within the main butterfly shaped panel 12 apertures 18, 20, 22, 24 and 26 are formed which allow for the insertion and tight fitting of the chanter stock, blow stick, and bass, middle tenor and outside tenor pipes. Surrounding each aperture and accommodating the tight fit of the bagpipe elements are nylon drone rings 19. To the front of the panel 12 the neck aperture 18 is formed to receive the chanter stock 28. At the top front portion of the panel 12 the blow stick aperture 20 is formed to receive the blow stick 30. Arrayed along the top side of the panel 12 the three pipe apertures are formed; the bass aperture 22 for receiving the base pipe 32, the middle tenor aperture 24 for receiving the middle tenor pipe 34, and outside tenor aperture 26 for receiving the outside tenor pipe 36. The nylon drone rings 19 encircle each of the formed apertures 18, 20, 22, 24 and 26. The drone rings 19 are approximately 1-1½ inches in thickness, enclose the apertures completely, and ensure an airtight seal between the pipe bag cover 10 and the bagpipe elements.

The butterfly shaped panel 12 has a long narrow portion at its bottom end 17*b* and a short wider portion at its top end 17*a*. The middle portion of the butterfly shaped panel 12 is wider, having the shape of wings. This winged mid-portion contains four of the nylon drone rings 19, the apertures for the blow stick 20, and the bass, middle tenor and outside tenor pipes 22, 24, 26, respectfully. The chanter stock aperture 18 is located and formed at the top end 17*a* of the butterfly panel 12.

Figure 2:
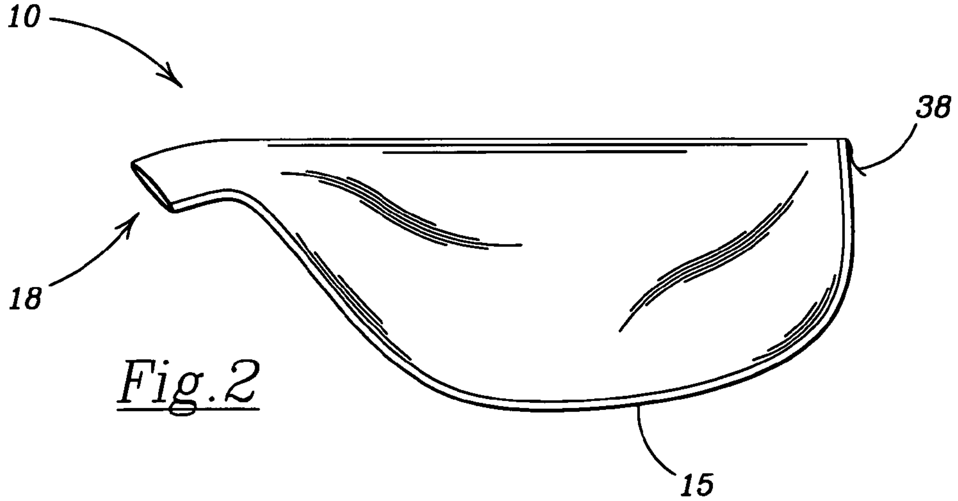
FIG. 2 is a side view of the closed pipe bag cover of the present invention.

FIG. 2 is a side view of the bagpipe cover 10, shown closed, encompassing the pipe bag. The pipe bag cover 10 has a bottom portion 15, to which the two mating parts of a zipper closure 38 mount. Each of the mating zipper closure parts 38*a*, 38*b* are shown in FIG. 1 on the outer edges of the side panels 14, 16. The zipper closure 38 connects the right and left side panels 14, 16 and allows for easy placement of the pipe bag within the pipe bag cover 10. The rear portions 40*a*, 40*b* of the side panels 14, 16 of bag pipe cover 10 have attached to each of them a five to nine inch length of cooperating Velcro®-type closure strips 42*a*, 42*b* for securing the rear end of the bag cover 10, creating a reinforced closure ensuring the integrity of the bag cover at its principal opening in the rear, while maintaining an airtight environment when closed.

Figure 3:
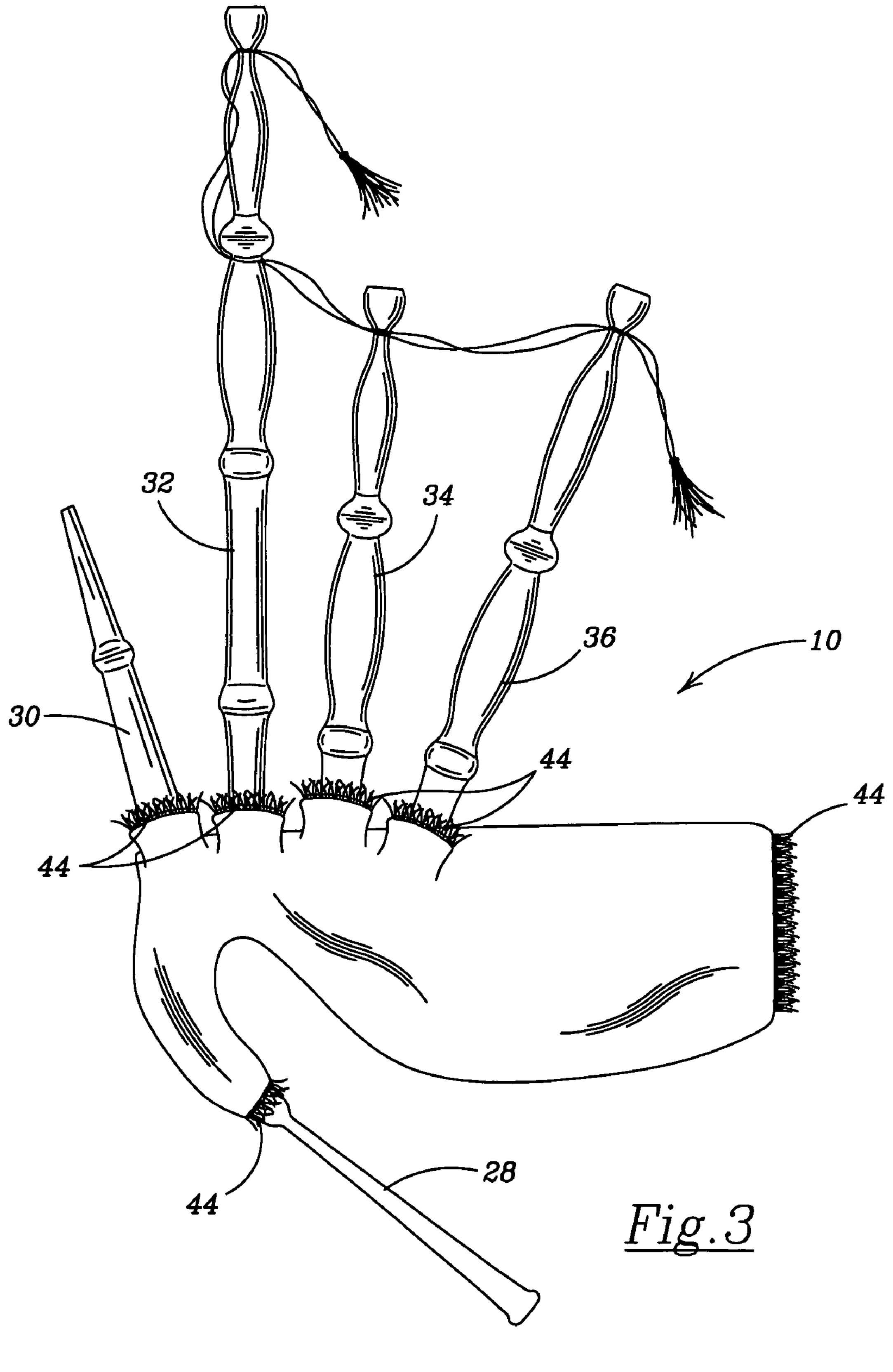
FIG. 3 is a perspective view of the pipe bag cover of the present invention mounted over the pipe bag and with the parts of the bagpipe properly positioned through the bag cover.

Shown in FIG. 3 is the pipe bag cover 10 placed over the pipe bag and with the bagpipe elements all in proper playing position. The bag cover 10 contains the apertures for the chanter stock 18, blow stick 20, bass 22, middle tenor 24 and outside tenor 26 with each reed in the appropriate aperture. Each aperture displays a chainette fringe 42 covering the external exposed portions of the nylon drone rings 19 that encircle each aperture. A chainette fringe 44 also covers the Velcro® closure 42 that is located on the rear portions 40*a*, 40*b* of the bag cover 10. The chainette fringe 44 measures about 1 inch in thickness and is for decorative purposes.

The bag cover can be manufactured in a number of sizes. However, due to its flexibility and expandability, the total number of sizes, and the potential for required customization, are significantly reduced. The bag covers 10 can be dimensioned as follows: for extra small pipe bags the cover is dimensioned at approximately 25⅞ inches, for small pipe bags the cover is dimensioned at approximately 28⅜ inches, for medium pipe bags the cover is dimensioned at approximately 31⅜ inches, and for large pipe bags the cover is dimensioned at approximately 32⅞ inches.

The proper mode of disassembly and reassembly is to begin by removing the old pipe bag cover by disconnecting each of the pipes 32, 34, 36, the blow stick 30, and the chanter stock 28 from engagement with the pipe bag. Remove the pipe bag from within the old bag cover. Insert the pipe bag into the new bag cover 10 of the present invention and locate and position the apertures in the pipe bag with the apertures in the bag cover 10. Reinsert the pipes 32, 34 and 36 through the drone rings 19 and into their respective positions in the pipe bag. Also reinsert the blow stick 30 and chanter stock 28 through the drone rings 19 and into the pipe bag as well. Zip the bag cover 10 closed using the zipper closure 38 and secure the Velcro® closure 42 at the rear of the bag to securely fasten and close the bag cover 10. The bag cover 10 now envelops the pipe bag with each of the bagpipe elements protruding through air-sealed apertures 18, 20, 22, 24 and 26 in the bag cover 10.

The present invention may be embodied in other specific terms without departing from the spirit of essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

The invention claimed is:

1. A cover for enveloping and holding the pipe bag of a bagpipe comprising a breathable, flexible and expandable material configured into a main butterfly shaped panel, said main panel having a series of apertures for the insertion and tight fitting of the chanter stock, blow stick, and bass, middle tenor and outside tenor pipes, and two flanking wing shaped side panels made of a natural fiber for increasing the frictional contact between the pipe bag and the pipe bag cover, and between the pipe bag cover and the bagpiper to prevent slippage of the pipe bag around the interior of the bag cover and the bag cover for its playing position while the piper is playing the pipes.

2. The pipe bags cover of claim 1, wherein the main panel is made of nylon elastane and the two flanking wing shaped side panels are made of cotton.

3. The pipe bag cover of claim 1, wherein the dimensions of the bag cover range from approximately 25⅞ inches for extra small pipe bags to 32⅞ inches for the large pipe bags.

4. The pipe bag cover of claim 1, wherein the apertures of the butterfly shaped panel have nylon drone rings encircling each aperture to ensure an airtight closure around the pipes, chanter stock and blow stick.

5. The pipe bag cover of claim 1, further comprising a partial zipper closure along a partial length of the bottom of the bag cover for easy access to the interior of the bag.

6. The pipe bag cover of claim 1, further comprising a hook and loop closure along the rear of the bag cover for easy access to the interior of the bag, creating a reinforced closure ensuring the integrity of the bag cover at its principal opening in the rear, while maintaining an airtight environment when closed.

* * * * *